United States Patent
Cocchi et al.

(10) Patent No.: US 8,572,998 B2
(45) Date of Patent: Nov. 5, 2013

(54) MACHINE FOR MAKING ICE-CREAM PRODUCTS

(75) Inventors: Gino Cocchi, Bologna (IT); Gianni Zaniboni, Borgonuovo di Sasso Marconi (IT); Roberto Lazzarini, Reggio Emilia (IT)

(73) Assignee: ALI S.p.A. (IT)

( * ) Notice: Subject to any disclaimer, the term of this patent is extended or adjusted under 35 U.S.C. 154(b) by 844 days.

(21) Appl. No.: 12/010,113

(22) Filed: Jan. 22, 2008

(65) Prior Publication Data

US 2008/0173038 A1 Jul. 24, 2008

(30) Foreign Application Priority Data

Jan. 23, 2007 (IT) .............................. BO2007A0035

(51) Int. Cl.
*A23G 9/00* (2006.01)

(52) U.S. Cl.
USPC .......................................... 62/342; 222/146.6

(58) Field of Classification Search
USPC .......... 62/342–343; 222/146.6, 425, 427, 452
See application file for complete search history.

(56) References Cited

U.S. PATENT DOCUMENTS

| 4,900,158 | A | 2/1990 | Ugolini |
| 6,010,033 | A * | 1/2000 | Dean .............................. 222/113 |
| 6,176,090 | B1 | 1/2001 | Ufema |
| 6,637,214 | B1 * | 10/2003 | Leitzke et al. .................... 62/68 |
| 7,354,192 | B2 * | 4/2008 | Jejcic ............................. 366/347 |
| 2006/0137542 | A1 | 6/2006 | Bravo |

FOREIGN PATENT DOCUMENTS

| DE | 2359710 | 8/1974 |
| WO | 03/022067 | 3/2003 |

OTHER PUBLICATIONS

European Search Report dated Nov. 11, 2008 from counterpart European patent application No. EP 08 10 0304.

* cited by examiner

*Primary Examiner* — Lakiya Rogers
(74) *Attorney, Agent, or Firm* — Timothy J. Klima; Shuttleworth & Ingersoll, PLC

(57) ABSTRACT

A machine for making ice-cream products includes a whipping and freezing unit with a horizontal axis, and an inspection door connected to one end of the whipping and freezing unit to allow access to the inside of the unit. The inspection door has a dispensing hole so that the whipping and freezing unit can be put in fluid communication with the outside environment and a dispensing door for selectively opening and closing the dispensing hole. The dispensing door includes a separator, having an opening, able to rotate relative to the inspection door so that the dispensing hole is selectively opposite the opening and allows controlled dispensing of ice-cream products from the whipping and freezing unit.

21 Claims, 3 Drawing Sheets

MACHINE FOR MAKING ICE-CREAM PRODUCTS

BACKGROUND OF THE INVENTION

The present invention relates to a machine for making ice-cream products.

More particularly, the present invention relates to a machine for making artisan ice-creams and the like of the type with a horizontal whipping and freezing unit.

As is known, a machine of this type includes a substantially box-shaped frame housing a whipping and freezing chamber with a horizontal axis.

The whipping and freezing chamber is designed to mix, cool and blend together a plurality of ingredients until they form an ice-cream, crushed-ice drink or the like.

The ingredients are inserted in the whipping and freezing chamber through an opening at the top of the frame which is in fluid communication with the whipping and freezing chamber.

The ice-cream made is made available through an opening in the whipping and freezing chamber located on one side of the box-shaped frame.

To allow inspection of the whipping and freezing chamber, useful for sanitizing it, the prior art machines have an inspection door consisting of a disk whose size is identical to the cross-section of the whipping and freezing chamber and hinged to the side of the box-shaped frame.

Obviously, to prevent ice-cream from continuously coming out of the above-mentioned door, the prior art machines include a dispensing door which is much smaller than the inspection door and which can be opened as required, which keeps the ice-cream inside the whipping and freezing chamber.

The dispensing door consists of a dispensing hole made in the above-mentioned disk, through which on each occasion a required quantity of ice-cream is taken out.

The dispensing door is equipped with a closing device consisting of a plug shaped to match the hole in the disk.

The plug is connected to the end of an arm, the other end of which is hinged to the disk.

The end of the arm connected to the disk is engaged by a pusher element which pushes the arm towards the disk, therefore pressing the plug against the ice-cream dispensing hole.

When ice-cream has to be taken out of the whipping and freezing unit, the above-mentioned pusher element is disabled and the plug, due to the pressure applied by the ice-cream through the outfeed hole, disengages from the hole, allowing the ice-cream to come out.

To allow the ice-cream to come out easily, the arm is also rotated relative to its hinge point on the disk, moving the plug completely away from the dispensing hole.

To interrupt the outflow of ice-cream, the arm is rotated again, returning the plug to the position in which it is aligned with the dispensing hole, then the pusher element is reactivated to engage the plug in the dispensing hole in a sealed fashion.

However, there may be several problems linked to use of the prior art machines briefly described above.

It is not entirely easy to take out predetermined doses from the whipping and freezing chamber, since the operations necessary to open and close the dispensing door require a great deal of time to disable and reactivate the pusher element and to rotate the closing plug.

During the time needed for these operations, carried out by a user, the ice-cream in the whipping and freezing unit comes out of the dispensing hole in quantities that cannot be defined in advance, therefore making it very difficult to predetermine the quantity of ice-cream taken out.

Moreover, since the pusher element which holds the plug in the dispensing hole acts on the rotatable arm at the end opposite to the plug, a torque is created on the rotatable arm which, after prolonged use, tends to bend the arm with a consequent poor seal being formed by the plug in the dispensing hole.

In addition, in the machines described above obviously it is not possible to choke the dispensing of ice-cream.

Finally, considering the high thrust force which the pusher element must apply to guarantee correct plug engagement in the dispensing hole, considerable operator effort is required to reset the pusher element when closing the dispensing door or, alternatively, there must be actuator devices to aid operations by the operator.

SUMMARY OF THE INVENTION

In this context, the aim of the present invention is to overcome the above-mentioned disadvantages.

In particular, the present invention has for an aim to provide a machine for making ice-cream products which allows predetermined quantities of ice-cream to be taken out.

The present invention also has for an aim to provide a machine for making ice-cream products which is easy and convenient for an operator to use during the operations for taking out ice-cream.

Another aim of the present invention is to provide a machine for making ice-cream products in which the ice-cream is correctly kept inside the whipping and freezing unit.

Another aim of the present invention is to provide a machine for making ice-cream products which can dispense the ice-cream made in a controlled and choked way.

Accordingly, the present invention achieves these aims with a machine for making ice-cream products comprising the features described in one or more of the claims herein.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

With reference to the accompanying drawings, the numeral 1 denotes as a whole a machine for making ice-cream products in accordance with the present invention.

Figure 1:
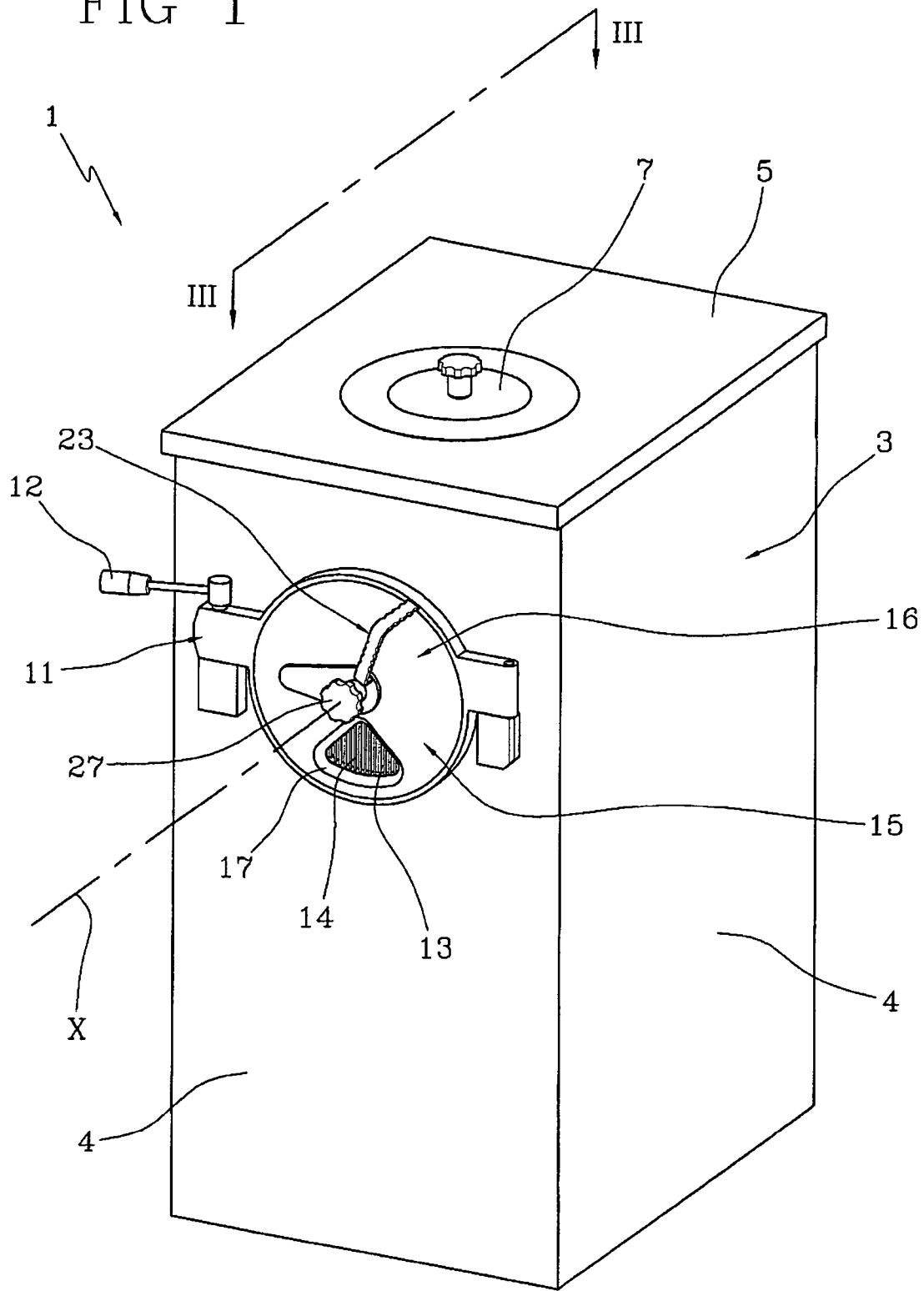
FIG. 1 is a perspective view of a machine for making ice-cream products in accordance with the present invention.

In particular with reference to FIG. 1, the machine 1 is of the type with a horizontal whipping and freezing unit 2 and includes a containment frame 3 housing the whipping and freezing unit 2, a plurality of motor elements and means for controlling and checking the whipping and freezing unit (of the known type and therefore not illustrated).

The frame 3 includes four lateral walls 4, an upper wall 5 and a base wall (not visible in the accompanying drawings).

In the frame 3 upper wall 5 there is an opening 6, closed by a suitable removable lid 7, for introducing the ingredients which must be whipped and frozen by the whipping and freezing unit 2 to make an ice-cream product. The opening 6 is in fluid communication with the inside of the whipping and freezing unit 2.

Figure 3:
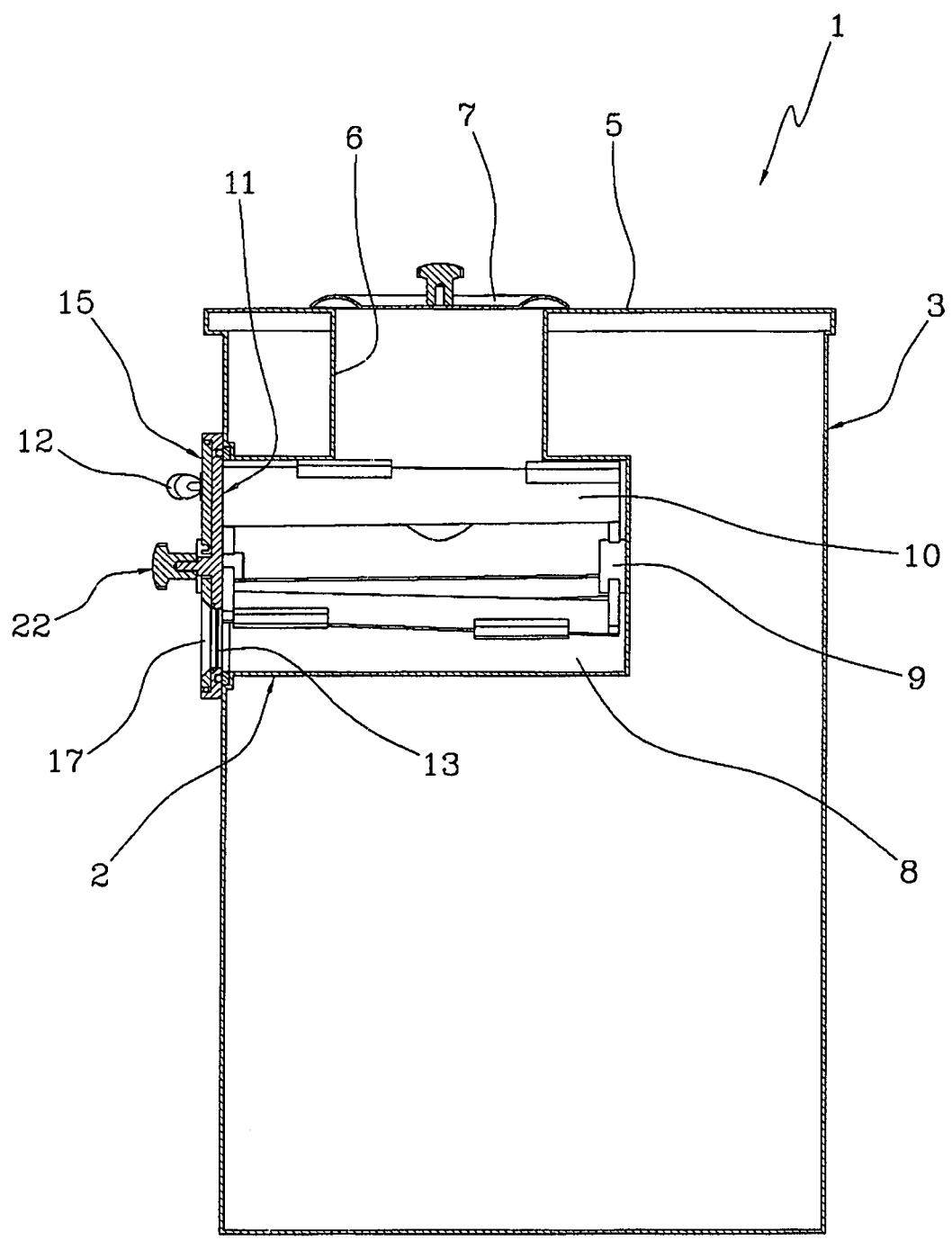
FIG. 3 is a cross-section according to plane III-III of the machine of FIG. 1.

The latter consists of a refrigerated chamber 8, substantially cylindrical and made of stainless steel, having a substantially horizontal axis of extension X (FIG. 3). Inside the chamber 8 there is a motor-driven stirrer 9 which rotates about the substantially horizontal axis of extension X of the chamber 8 and includes a plurality of blades 10. Rotation of the stirrer 9, and therefore of the blades 10, mixes the ingredients introduced into the whipping and freezing unit and pushes the creamy mass of ice-cream being formed towards one end of the whipping and freezing unit 2 chamber 8.

The end of the whipping and freezing chamber 8 is closed in a sealed fashion by an inspection door 11 (FIGS. 1 and 3) designed to keep the ice-cream inside the whipping and freezing unit 8 and allow an inspection of the inside of the whipping and freezing chamber 8 for maintenance and/or sanitizing.

For this purpose, the dimensions of the inspection door 11 are equal to or greater than the transversal dimensions of the whipping and freezing chamber 8, so as to allow easy and complete access to it.

In particular, the inspection door 11 is substantially vertical, is positioned on one of the lateral walls 4 of the containment frame 3 and is hinged to it so that it can be opened and closed. A closing bolt 12 (FIG. 1) holds the inspection door 11 in the closed position.

As illustrated in FIG. 1, the inspection door 11 is disk-shaped and includes a dispensing hole 13 for the ice-cream formed by the whipping and freezing unit 2.

The dispensing hole 13 allows ice-cream to be taken out without the need to open the inspection door 11 which, as described, has dimensions too big to allow controlled taking out of ice-cream.

Therefore, the dimensions of the dispensing hole 13 are much smaller than those of the inspection door 11 and it has a mask consisting of a plurality of vertical thin plates 14 which again mix the mass of ice-cream as it is dispensed. The dispensing hole 13 can be accessed through a dispensing door 15 which allows the dispensing hole 13 to be closed and opened every time doses of ice-cream need to be taken out.

Advantageously, the dispensing door 15 includes a separator 16 extending vertically, which can rotate relative to the inspection door 11 and is directly opposite the latter.

An opening 17, flared towards the outside environment, is made in the separator 16, in such a way that, following rotation of the latter the opening may or may not be opposite the dispensing hole 13.

When the opening 17 in the separator is opposite the dispensing hole 13 the ice-cream can flow from the whipping and freezing chamber 8 towards the outside environment, whilst when the opening 17 in the separator 16 is not opposite the dispensing hole 13 the ice-cream cannot flow towards the outside environment.

It should be noticed that intermediate conditions are possible between the position in which the opening 17 and the dispensing hole 13 are opposite one another or perfectly aligned and the position in which they are completely out of alignment.

In particular, partial overlapping is possible, therefore a position in which the opening 17 and the dispensing hole 13 are partly opposite one another, consequently allowing choked and controlled dispensing of the ice-cream from the whipping and freezing chamber 8.

As indicated, the inspection door 11 is disk-shaped and includes two vertical walls which are opposite one another, substantially flat and through which the dispensing hole 13 passes.

The separator 16 is also disk-shaped, includes two substantially flat walls which are opposite one another and through which the opening 17 passes, and it can rotate relative to the inspection door 11.

More particularly, the separator 16 and the inspection door 11 are rotatably connected to one another at respective centers of symmetry S, S1, lying along the whipping and freezing unit 2 axis of extension X.

Figure 2:
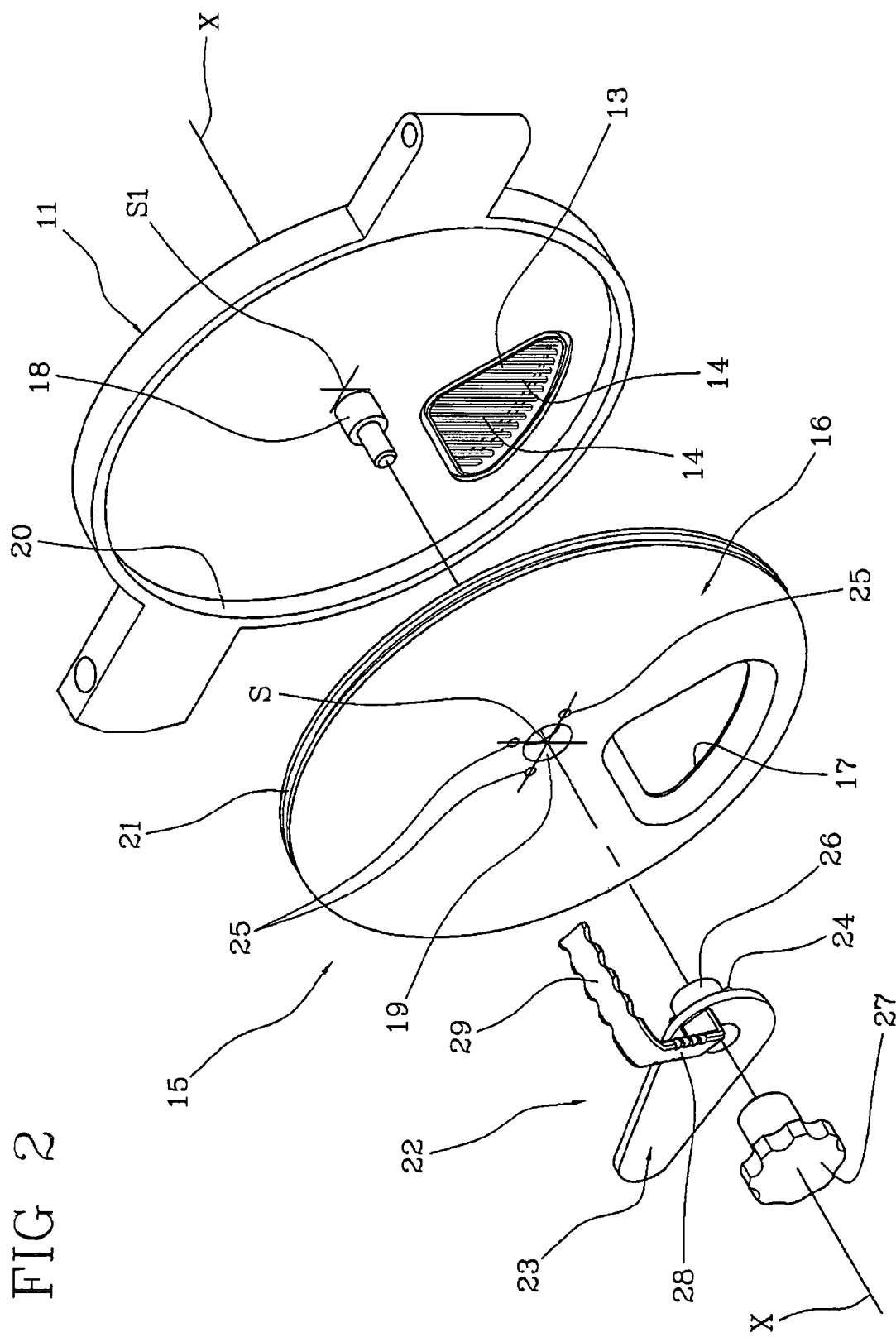
FIG. 2 is an enlarged exploded view of a detail of the machine from FIG. 1.

For this purpose, as illustrated in FIG. 2, the inspection door 11 is fitted with a pin 18 extending from the center S1 of it towards the separator 16 and which rotatably engages in a central hole 19 in the separator 16.

Moreover, to guarantee a connection between the separator 16 and the inspection door 11, the latter has an annular shoulder 20 extending along the entire outer edge to receive the disk-shaped separator 16 with a made-to-measure fit.

The entire outer edge of the separator is fitted with a seal 21 which makes contact directly with the annular shoulder 20 of the inspection door 11.

To activate and deactivate ice-cream dispensing through the dispensing hole 13, and therefore to rotate the separator 16 relative to the inspection door 11, the dispensing door 15 includes movement means 22.

As illustrated in the accompanying drawings, and in particular in FIG. 2, the movement mechanism 22 includes a handle 23, which can be gripped by an operator, connected to the separator 16.

In this way, by gripping and rotating the handle 23, an operator can completely or partly open and close the dispensing hole 13.

In particular, the handle 23 is connected to the separator 16 at the center S of the latter and includes three pins 24 (of which only one is visible in FIG. 2) inserted in the same number of holes 25 in the separator 16 next to the central hole 19.

To guarantee a stable connection between the handle 23 and the separator 16 and at the same time to guarantee that the separator 16 remains in close contact with the inspection door 11, the handle 23 includes a bushing 26 inserted in the central hole 19 in the separator 16 and engaging with the central pin 18 of the inspection door 11 (FIG. 2).

A tightening element 27, in particular a knob, is inserted in the bushing 26 and stably connected, for example by screwing, to the central pin 18 of the inspection door 11.

In this way, the bushing 26, and therefore the handle 23, can rotate about the axis X relative to the inspection door 11 and to the tightening element 27 pulling the separator 16 in such a way that it rotates.

It should be noticed that the tightening element 27 stops separator 16 movement along the axis X, guaranteeing that the separator remains in close contact with the inspection door 11 and avoiding ice-cream leaks between the inspection door 11 and the separator 16.

In the preferred embodiment illustrated in the accompanying drawings, the handle 23 includes a drive portion 28 extending from the center of the separator 16 and away from it, and a handgrip 29 extending from the drive portion 28 and as far as the separator 16 in a direction substantially parallel with the axis of rotation X of the whipping and freezing unit 2.

The free end of the handgrip 29, opposite the end connected to the drive portion 28, is connected to the separator 16, so as to stiffen the handle 23 structure.

The invention achieves the preset aims.

The rotatable separator 16, even only partially opening the dispensing hole, allows predetermined quantities of ice-cream to be taken out.

Moreover, the dispensing door can easily and conveniently be used by an operator during the operations for taking out ice-cream.

In addition, the sealed connection between the separator and the inspection door guarantees that the ice-cream is correctly kept inside the whipping and freezing unit.

The invention described above is susceptible of industrial application and may be modified and adapted in several ways without thereby departing from the scope of the inventive concept. Moreover, all the details of the invention may be substituted by technically equivalent elements.

What is claimed is:

1. A machine for making ice-cream products comprising:
a whipping and freezing unit having a substantially horizontal axis;
an inspection door connected to one end of the whipping and freezing unit to allow access to an interior of the whipping and freezing unit, the inspection door having a dispensing hole positioned below the substantially horizontal axis for placing the whipping and freezing unit in fluid communication with an outside environment when the inspection door is closed;
a dispensing door for selectively opening and closing the dispensing hole;
wherein the dispensing door comprises a separator rotatably connected to the inspection door and having an opening,
wherein rotation of the separator relative to the inspection door, with the substantially horizontal axis of the whipping and freezing unit being a center of the rotation of the separator when the inspection door is closed, selectively slides the opening of the separator between a position of no overlap with the dispensing hole whereby the dispensing hole is closed, and a position of overlap with the dispensing hole whereby the dispensing hole is open for dispensing a quantity of ice-cream product from the whipping and freezing unit to the outside environment.

2. The machine according to claim 1, wherein the dispensing door comprises a movement mechanism, connected to the separator for rotating the separator relative to the inspection door.

3. The machine according to claim 1, wherein the inspection door comprises a flat, substantially vertical wall, extending on an opposite side to the whipping and freezing unit; the separator comprising a flat, substantially vertical wall, rotatably connected to the flat wall of the inspection door.

4. The machine according to claim 3, wherein the flat wall of the separator rotates relative to the flat wall of the inspection door along said substantially horizontal axis of the whipping and freezing unit.

5. The machine according to claim 1, wherein the inspection door and the separator are substantially disk-shaped with each having a center, and are rotatably connected to one another at the respective centers.

6. The machine according to claim 5, wherein the inspection door comprises a pin projecting from the center of the inspection door, the separator includes a hole positioned at the center of the separator for rotatably engaging the pin, thereby allowing the separator to rotate on the pin relative to the inspection door.

7. The machine according to claim 6, wherein the inspection door comprises an annular shoulder surrounding the flat wall; and the separator includes an outer edge engaging the annular shoulder.

8. The machine according to claim 7, wherein the outer edge of the separator comprises a seal sealing the annular shoulder of the inspection door.

9. The machine according to claim 2, wherein the movement mechanism comprises a handle connected to the separator.

10. The machine according to claim 9, wherein the handle is connected at a center of the separator.

11. The machine according to claim 10, wherein the handle comprises a drive portion extending away from the center of the separator, and a handgrip extending away from the drive portion towards the separator.

12. The machine according to claim 10, wherein the handle comprises a bushing inserted in a central hole in the separator and rotatably engaging on a central pin of the inspection door.

13. The machine according to claim 12, wherein the handle comprises at least one pin inserted in a respective hole of the separator positioned radially outward of the central hole to rotatably connect the handle and the separator.

14. The machine according to claim 12, wherein the movement mechanism comprises a tightening element passing through the handle and the central hole in the separator and connected to the central pin of the inspection door, to prevent the separator and the handle from moving along the substantially horizontal axis of rotation of the separator.

15. The machine according claim 1, wherein dimensions and shape of the opening in the separator are substantially the same as dimensions and shape of the dispensing hole in the inspection door.

16. The machine according to claim 1, wherein the opening in the separator is flared towards the outside environment.

17. The machine according to claim 1, and further comprising a plurality of vertical thin plates crossing the dispensing hole.

18. The machine according to claim 1, comprising a containment frame for the horizontal whipping and freezing unit; the inspection door being connected to a wall of the frame and being able to open relative to the wall of the frame.

19. The machine according to claim 18, comprising an opening in an upper wall of the frame which is in fluid communication with the whipping and freezing unit for introduction of ingredients into the whipping and freezing unit.

20. A machine for making ice-cream products comprising:
a whipping and freezing unit having a substantially horizontal axis;
an inspection door connected to one end of the whipping and freezing unit to allow access to an interior of the whipping and freezing unit, the inspection door having a dispensing hole for placing the whipping and freezing unit in fluid communication with an outside environment;
a dispensing door for selectively opening and closing the dispensing hole;
wherein the dispensing door comprises a separator connected to the inspection door and having an opening, the separator being rotatable relative to the inspection door in a plane of rotation perpendicular to the substantially horizontal axis to selectively move the opening of the separator between a position of no overlap with the dispensing hole to close the dispensing hole, and a position of overlap with the dispensing hole to open the dispensing hole;

wherein the dispensing door comprises a movement mechanism, connected to the separator for rotating the separator relative to the inspection door;

wherein the movement mechanism comprises a handle connected to the separator;

wherein the handle is connected at a center of the separator;

wherein the handle comprises a bushing inserted in a central hole in the separator and rotatably engaging on a central pin of the inspection door.

21. A machine for making ice-cream products comprising:

a whipping and freezing unit having a substantially horizontal axis;

an inspection door connected to one end of the whipping and freezing unit to allow access to an interior of the whipping and freezing unit, the inspection door having a dispensing hole positioned below the substantially horizontal axis for placing the whipping and freezing unit in fluid communication with an outside environment when the inspection door is closed;

a dispensing door for selectively opening and closing the dispensing hole;

wherein the dispensing door comprises a separator having an opening, the separator having a separator axis and being rotatably connected to the inspection door the separator having a plane of rotation perpendicular to the substantially horizontal axis being parallel to the substantially horizontal axis of the whipping and freezing unit when the inspection door is closed, wherein rotation of the separator relative to the inspection door, with the separator axis being a center of the rotation of the separator, selectively slides the opening of the separator between a position of no overlap with the dispensing hole whereby the dispensing hole is closed, and a position of overlap with the dispensing hole whereby the dispensing hole is open for dispensing a quantity of ice-cream product from the whipping and freezing unit to the outside environment.

* * * * *